US008159499B2

(12) United States Patent
Siegel et al.

(10) Patent No.: US 8,159,499 B2
(45) Date of Patent: Apr. 17, 2012

(54) RENDERING OF SHADOWS WITH HAND-PAINTED APPEARANCE

(75) Inventors: Lewis N. Siegel, Burbank, CA (US); Christopher Daniel Springfield, Glendale, CA (US); Robert L. Miles, Sun Valley, CA (US); Donald Adolph Lusinsky, Fullerton, CA (US)

(73) Assignee: Disney Enterprises, Inc., Burbank, CA (US)

( * ) Notice: Subject to any disclaimer, the term of this patent is extended or adjusted under 35 U.S.C. 154(b) by 962 days.

(21) Appl. No.: 12/151,835

(22) Filed: May 8, 2008

(65) Prior Publication Data

US 2009/0033673 A1 Feb. 5, 2009

Related U.S. Application Data

(60) Provisional application No. 60/953,666, filed on Aug. 2, 2007.

(51) Int. Cl.
*G09G 5/00* (2006.01)

(52) U.S. Cl. ......... 345/582; 345/426; 345/428; 348/131

(58) Field of Classification Search ........................ None
See application file for complete search history.

(56) References Cited

U.S. PATENT DOCUMENTS

| 5,495,536 | A * | 2/1996 | Osbourn ........................ 382/199 |
| 6,195,099 | B1 | 2/2001 | Gardiner |
| 6,349,113 | B1 * | 2/2002 | Mech et al. .............. 375/240.08 |
| 7,197,182 | B2 * | 3/2007 | Selan ............................. 382/167 |
| 7,242,408 | B1 * | 7/2007 | Dunn ............................. 345/582 |
| 7,817,823 | B1 * | 10/2010 | O'Donnell ..................... 382/103 |
| 2004/0257365 | A1 | 12/2004 | Robart |
| 2007/0110309 | A1 | 5/2007 | Ibrahim et al. |
| 2007/0170376 | A1 * | 7/2007 | Neerhof et al. .......... 250/504 R |

OTHER PUBLICATIONS

International Search Report PCT/US08/070877 dated Oct. 3, 2008.
H. Pritchett & T. Lancaster, "RenderMan in production at WDFA," ACM SIGGRAPH 2006 Courses (Session: RenderMan for Everyone, Article No. 5).
B. Burley, "Shadow map bias cone and improved soft shadows: Disney bonus section," ACM SIGGRAPH 2006 Courses (Session: Render Man for Everyone, Article No. 6).

* cited by examiner

*Primary Examiner* — Kee M Tung
*Assistant Examiner* — Michelle Chin
(74) *Attorney, Agent, or Firm* — Kilpatrick Townsend & Stockton LLP

(57) ABSTRACT

Shadows are rendered automatically with a hand-painted appearance. The shadow region is divided into a core and a penumbra. A core perturbation zone is defined between the core and penumbra and a penumbra perturbation zone is defined between the penumbra and an unshadowed region. Within each perturbation zone, a texture is applied to each pixel to map the pixel as being inside or outside the core or penumbra boundary, thereby defining a displaced core boundary and a displaced penumbra boundary. The displaced boundaries can be non-linear and discontinuous. When shadows are rendered using the displaced boundaries, a hand-painted appearance can result. An additional texture can be applied in the penumbra to further enhance the painted appearance.

27 Claims, 20 Drawing Sheets

RENDERING OF SHADOWS WITH HAND-PAINTED APPEARANCE

CROSS-REFERENCES TO RELATED APPLICATIONS

This application claims the benefit of U.S. Provisional Application No. 60/953,666, filed Aug. 2, 2007, entitled "Rendering of Shadows with Hand-Painted Appearance," which disclosure is incorporated herein by reference for all purposes.

BACKGROUND OF THE INVENTION

The present invention relates in general to computer-generated animation and in particular to rendering shadows with a hand-painted appearance.

Three-dimensional (3-D) animation generally begins with a geometric model of the objects that will appear in the animated scene. Each object is modeled, e.g., as a mesh of polygons in 3-D space, and various attributes of the object's surface are associated with points in the mesh, such as the vertices of the polygons. For example, attributes associated with a point often include a color, a surface normal, a transparency parameter, reflectivity parameters, and one or more sets of texture coordinates, allowing one or more textures to be applied to the surface.

To generate (render) the images, the positions of various objects in the scene are established; for animated images, each image is generated to correspond to a particular time, and positions of at least some objects may vary with time. A viewpoint, or virtual camera position, is established, and a screen area (generally normal to the camera) is defined. The screen area is divided into small sub-areas, referred to herein as pixels, and a color for each pixel is determined based on the attributes of the object (or objects) that project onto that pixel. Which object(s) project onto a pixel can be determined using a variety of techniques, including ray-tracing. In ray tracing, rays are drawn from the pixel to the object (or from the object to the pixel), and the intersection of the ray with the object's surface determines which portion of the object's surface (e.g., which polygon or which vertices) should be used to compute the pixel's color. Computers are used extensively in both the modeling and rendering phases.

Computer-generated 3-D animation (referred to herein as "CGA") usually approximates a photorealistic look. Objects have crisp, smooth edges and surfaces that do not bleed or smear into each other. Shadows are modeled exactly based on straight-line propagation of light around the edges of objects, so that the rendered shadow looks like the shadow that a real object would cast.

This photorealistic look of CGA is esthetically limiting. Traditional hand-drawn animation allows the animator to depart from photorealistic rendering and adopt a more "painterly" style, with uneven brush strokes, "loose" paint (i.e., disconnected fragments of paint matching an object's color) at edges of objects and so on. This artistic freedom allows the artist to adapt the look of the animated world to fit the story being told, and this stylization is generally regarded as one of the advantages of animation over live action.

Efforts to duplicate this painterly look in CGA have not been satisfying. For instance, paintbrush textures have been applied to rendered scenes, but the result is usually a displeasing "screen door" effect as the characters and other objects move under a fixed texture. Other attempts to apply paintbrush-like textures to objects have led to distracting "popping" as loose paint bits appear and disappear from one frame to the next. Some techniques for incorporating painterly elements, e.g., into backgrounds, have been developed, but these techniques generally have not scaled well or been easy to integrate into CGA processes.

In the case of shadows, it has been difficult to render a shadow that looks "painted." Painters usually create the shadows separately from the objects. Thus, for instance, to the extent that an edge of an object is uneven (e.g., due to wavering brush strokes or loose paint), that unevenness is generally not duplicated in the shadow. But the shadow generally does have its own uneven quality as a result of the painter's technique. Prior art efforts to render painterly shadows have generally relied simply on blurring or softening the edges of shadow regions, but such blurring does not impart a brush-stroke character to the shadows.

It would therefore be desirable to provide improved computer-based techniques for rendering images with a painterly look.

BRIEF SUMMARY OF THE INVENTION

Embodiments of the present invention provide techniques for rendering shadows with a hand-painted appearance. The shadow region is divided into a core and a penumbra. Two transitional zones (referred to herein as "perturbation zones") are defined: a core perturbation zone along the boundary between the core and penumbra and a penumbra perturbation zone along the boundary between the penumbra and an unshadowed region. Within the core perturbation zone, a texture is applied to each pixel to map the pixel as being inside or outside the core boundary, thereby defining a displaced core boundary; similarly, within the penumbra perturbation zone, a texture is applied to each pixel to map the pixel as being inside or outside the penumbra boundary, thereby defining a displaced penumbra boundary. The displaced boundaries can be non-linear and discontinuous. When shadows are rendered using the displaced boundaries, a hand-painted appearance can result. An additional texture can be applied in the penumbra to further enhance the painted appearance.

One aspect of the present invention relates to a method for rendering shadows. A baseline shadow is generated. The baseline shadow has a core and a penumbra. Within the baseline shadow, a penumbra perturbation zone is defined. A penumbra edge texture map is associated with the penumbra perturbation zone. Based on the penumbra edge texture map, it is determined whether each point of a plurality of points within the penumbra perturbation zone is within a displaced penumbra boundary. An image is rendered using the displaced penumbra boundary, with points within the displaced penumbra boundary being rendered as part of the penumbra and points outside the displaced penumbra boundary being rendered as part of an unshadowed region.

Another aspect of the present invention relates to a method for rendering shadows. A baseline shadow is generated. The baseline shadow has a core and a penumbra. Within the baseline shadow, a core perturbation zone and a penumbra perturbation zone are defined. A core edge texture map is associated with the core perturbation zone, and a penumbra edge texture map is associated with the penumbra perturbation zone. Based on the core edge texture map, it is determined whether each point of a plurality of points within the core perturbation zone is within a displaced core boundary. Similarly, based on the penumbra edge texture map, it is determined whether each point of a plurality of points within the penumbra perturbation zone is within a displaced penumbra boundary. An image is rendered using the displaced core boundary and the displaced penumbra boundary, with points within the displaced core boundary being rendered as part of the core and points within the displaced penumbra boundary but not within the displaced core boundary being rendered as part of the penumbra.

Embodiments of the present invention can be used to create a motion picture product comprising a sequence of images stored on a storage medium, the sequence of images including images of objects having shadows, with the shadows being rendered in accordance with processes disclosed herein. These processes can give the shadows a painterly appearance and enhance an overall painterly quality of the rendered images making up the motion picture.

The following detailed description together with the accompanying drawings will provide a better understanding of the nature and advantages of the present invention.

BRIEF DESCRIPTION OF THE DRAWINGS

FIGS. 8A-8H illustrate stages of a rendering process, while FIGS. 8I and 8J illustrate effects of varying shadow rendering parameters.

FIGS. 9 and 10 are rendered images of scenes with painterly shadows rendered according to an embodiment of the present invention.

DETAILED DESCRIPTION OF THE INVENTION

Figure 1:
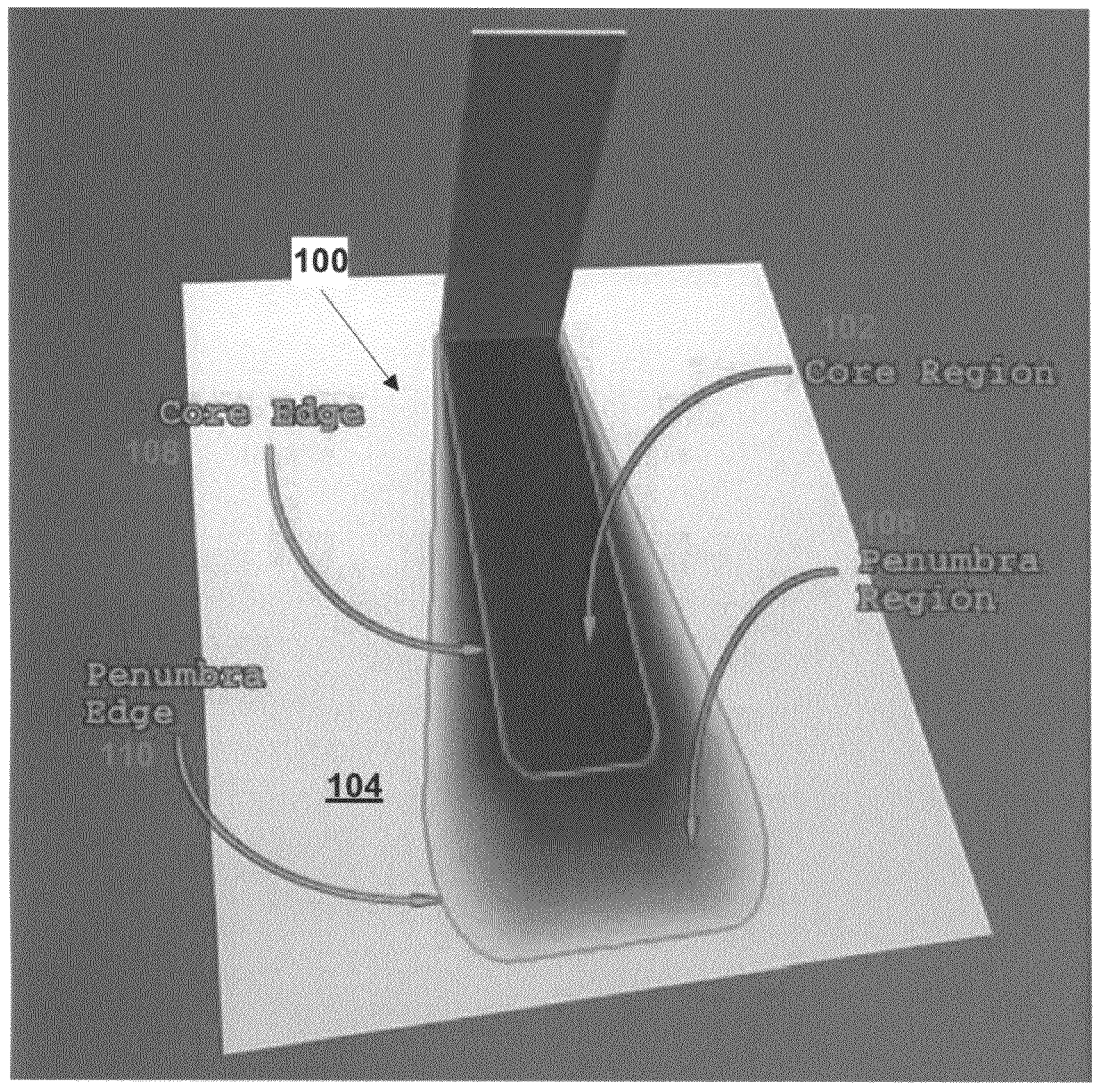
FIG. 1 illustrates a baseline shadow that can be used to practice the present invention.

Embodiments of the present invention can be used in conjunction with other techniques for achieving a painterly look in a rendered image. For example, commonly-owned co-pending U.S. patent application Ser. No. 12/074,622, filed Mar. 4, 2008, describes a multi-surface rendering technique. As described therein, auxiliary surfaces with brushstroke transparency maps are associated with portions of a reference surface that defines the general shape and features of an object to be rendered. The auxiliary surfaces are used to blend transitions between objects and backgrounds, creating rough or "loose" edges. These loose edges, however, generally do not produce a visually pleasing effect when used to project shadow maps for either self-shadows or cast shadows; unpleasant artifacts can arise.

Embodiments of the present invention provide techniques that can be used to create painterly shadows from reference objects that might or might not themselves be painterly. These techniques can be used to perturb and colorize the edges of shadows cast from objects onto themselves or onto other objects. The painterly shadow techniques described herein are based on conventional blurred shadows or soft shadows and entail perturbations within the partially shadowed areas.

Painterly shadows can be implemented in a rendering program under user control, with users specifying parameters to control various aspects of the shadow-generation procedure. For example, users can supply arbitrary textures that are used to perturb the inner and outer edges of partially shadowed regions; other textures can be used to introduce color variations into those regions.

The painterly shadow techniques described herein are based on blurred shadows, or soft shadows. Such shadows generally have an inner region, in which the shadow is uniformly and maximally dark (this region is completely in shadow), and a surrounding gradient region within which the shadow gradually lightens toward an outer edge. Conventional or other software techniques can be used to produce a shadow with soft edges that can be interpreted as a gradient. For example, shadows can simply be blurred or produced using shadow algorithms based on area light sources. Another technique for generating shadows with soft edges is Single Map Soft Shadows, as described in B. Burley, "Shadow map bias cone and improved soft shadows," ACM SIGGRAPH 2006 Courses (Session: RenderMan for Everyone, Article No. 6). Embodiments of the present invention can use any soft or blurred shadow, regardless of how it is generated, as a baseline shadow.

The painterly shadow techniques described herein need not affect any portions of a surface that are either completely in shadow (i.e., within the core region of a baseline shadow) or completely in light (i.e., outside the penumbra of the baseline shadow). Instead, modifications are applied to areas that are partially shadowed (e.g., where a shadow value is between 0 and 1). The degree to which these techniques affect a baseline shadow will depend on the properties of the baseline shadow. For instance, shadows with unblurred, high-contrast edges may be affected minimally if at all; the softer the shadow, the more dramatic the effect.

In some embodiments, painterly shadows are created using two or more user-specified textures to perturb the boundaries of the partially shadowed area (as determined from the baseline shadow), after which a third texture can optionally be used to introduce color variation and transparency into the partially shadowed region. In other embodiments, just one texture is used, and that texture can be used for both boundary perturbations and color variations. In still other embodiments, no textures are used; softness parameters (e.g., as described below) can support combining and applying smooth color gradients along shadow edges.

FIG. 1 illustrates a baseline shadow 100 that can be used to practice the present invention. As shown in FIG. 1, baseline shadow 100 can be segmented into three primary regions: a "core" region 102 that is completely shadowed, a region 104 that is completely un-shadowed, and a "penumbra" region 106 that is in partial shadow. In general, penumbra region 106 lies between core region 102 and unshadowed region 104. A "core edge" 108 is defined as the boundary between core region 102 and penumbra region 106, and a "penumbra edge" 110 is defined as the boundary between penumbra region 106 and un-shadowed region 104. In embodiments described herein, core edge 108 is significant in embodiments where color and/or transparency modifications are applied to penumbra region 106 (e.g., as described below). If core edge 108 is perturbed, but no color or transparency modification is applied to penumbra region 106, core edge perturbation will have no visible effect on the image.

Figure 2:
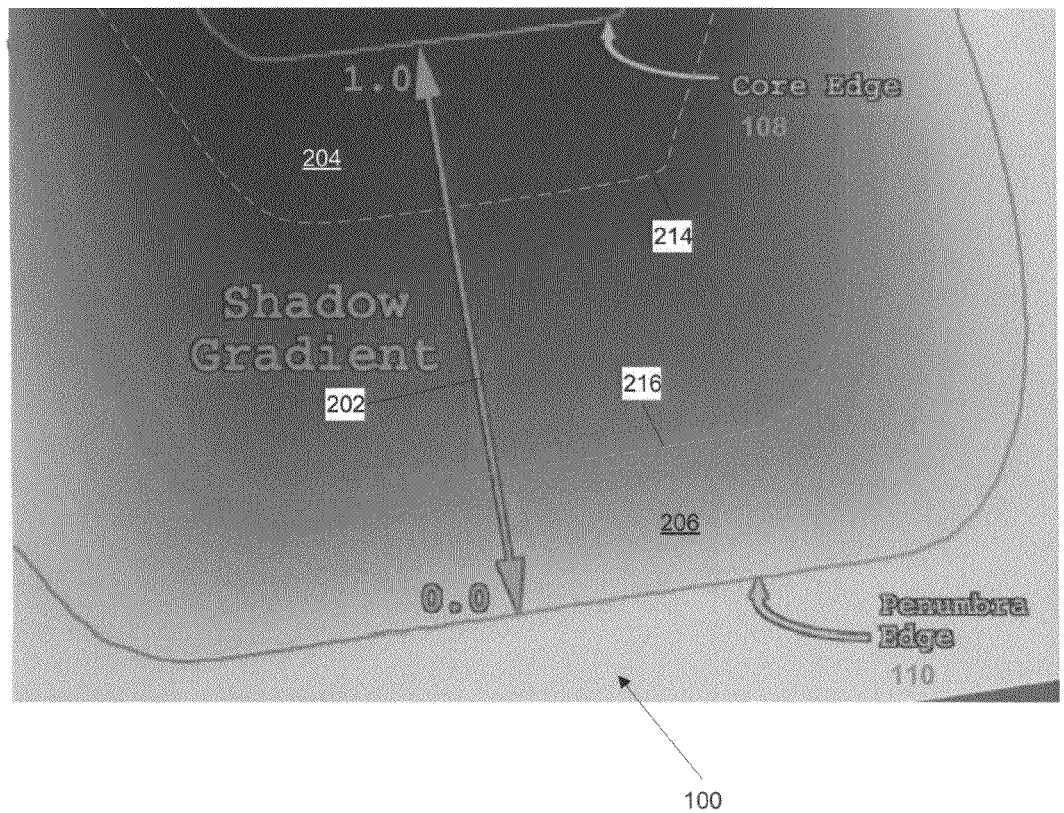
FIG. 2 is a close-up of a portion of the baseline shadow of FIG. 1.

FIG. 2 is a close-up of a portion of baseline shadow 100, illustrating a "shadow gradient" 202 extending from core edge 108 to penumbra edge 110. In general, the shadow is darker (denser) toward the core edge and lighter toward the penumbra edge. As known in the art, the variation in shadow density can be represented by assigning a shadow gradient value in the range from 0.0 to 1.0 to each point on the shadowed surface, with 0.0 representing completely unshadowed, 1.0 representing fully shadowed, and intermediate values representing partially shadowed, or penumbra, regions.

In other embodiments, shadow gradient 202 can be defined as a vector whose direction roughly tracks the direction in which the shadow decreases or as a line extending orthogonally outward from core edge 108. It is to be understood that a shadow gradient can be defined from any point on core edge 108 or any point on penumbra edge 110. The length of the shadow gradient (i.e., the distance in the screen plane from the core edge to the penumbra edge) can be used as a reference length, and other displacements can be defined as percentages or fractions of the shadow gradient length.

In accordance with an embodiment of the present invention, a shadow is given a painterly appearance by perturbing or displacing the core edge and penumbra edge in an arbitrary way that results in rough edges and a visual effect that resembles loose paint. To achieve a desirable perturbation in some embodiments, two additional zones are defined in relation to the shadow gradient, as illustrated in FIG. 2. A "core perturbation zone" 204 extends outward from the core edge to a maximum distance (represented by dashed line 214) of, e.g., 30% of the shadow gradient; this maximum distance is also referred to herein as a "core edge size." Similarly, a "penumbra perturbation zone" 206 extends inward from the penumbra edge to a maximum distance (represented by dashed line 216) of, e.g., 25% of the shadow gradient; this maximum distance is also referred to herein as a "penumbra edge size." In one embodiment, the core perturbation zone is defined with reference to a range of shadow gradient values (e.g., shadow gradient values greater than 0.7 and less than 1.0 can be considered to be within the core perturbation zone); similarly, the penumbra perturbation zone can be defined with reference to a range of shadow gradient values (e.g., shadow gradient values greater than 0.0 and less than 0.25 can be considered to be within the penumbra perturbation zone). Thus, "core edge size" or "penumbra edge size" can refer to the size of the range of shadow gradient values within the perturbation zone, as well as to a fraction of shadow gradient length. The edge size (or width) of core perturbation zone 204 and penumbra perturbation zone 206 may be varied; in some embodiments, the core edge size and penumbra edge size are user-settable parameters.

Figure 4:
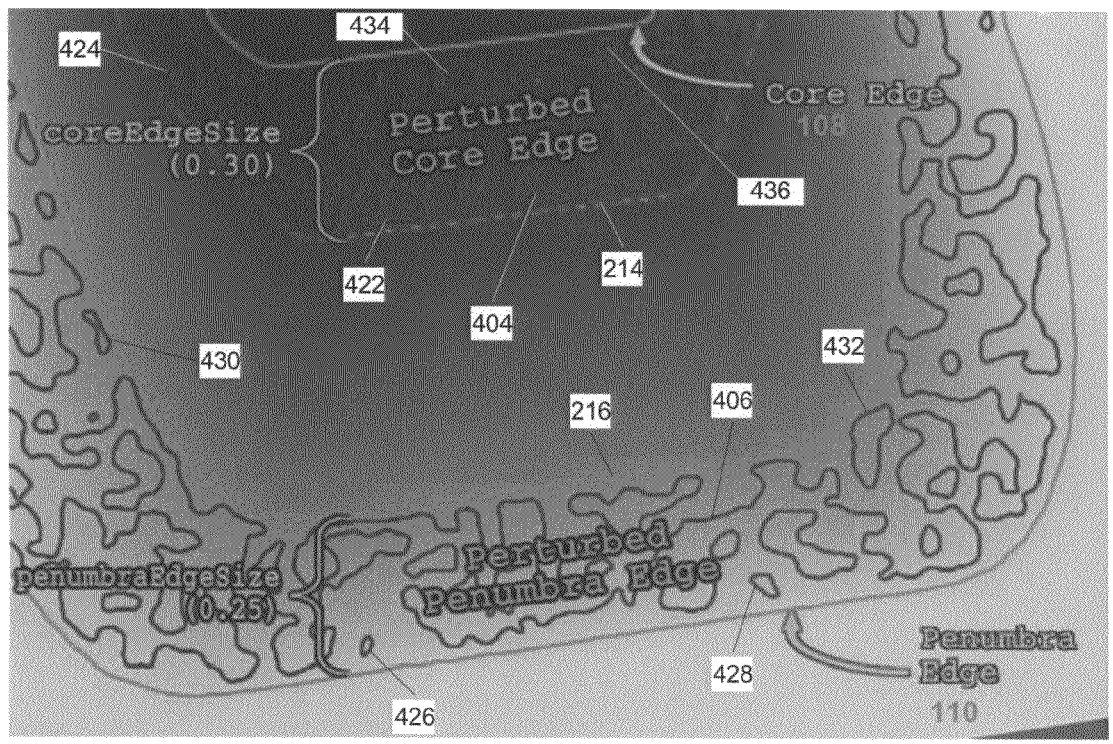
FIG. 4 illustrates perturbed core and penumbra edges according to an embodiment of the present invention.

Within core perturbation zone 204, the core edge can be perturbed (or displaced) outward (i.e., toward the penumbra edge) in accordance with a user-defined core edge texture map. Similarly, within penumbra perturbation zone 206, the penumbra edge can also be perturbed (or displaced) inward (i.e., toward the core edge) in accordance with a user-defined penumbra edge texture map. It should be noted that the same or different texture maps can be used for the core edge and penumbra edge perturbations. Examples of perturbed core and penumbra edges are shown in FIG. 4, described below.

Figure 3:
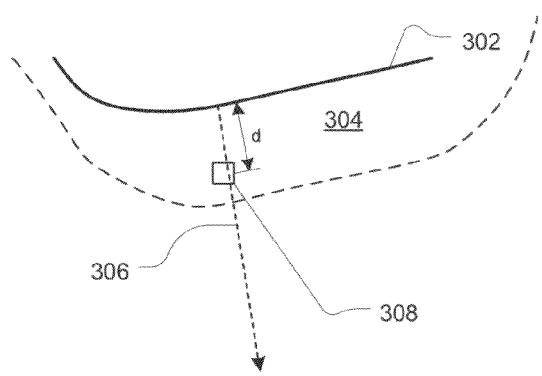
FIG. 3 illustrates a pixel in a perturbation zone of a shadow as defined according to an embodiment of the present invention.

In some embodiments, the core edge texture map and penumbra edge texture map each associate a single value in a range from 0.0 to 1.0 with each pixel; for example, user-defined luminance textures can be used, and the luminance textures can be projected onto the image plane from a desired coordinate system, such as the coordinate system of the light source that casts the shadow being rendered. For core perturbation zone 204, this texture map is used to determine which pixels are inside or outside the core. For example, FIG. 3 shows a core edge 302 and a core perturbation zone 304. The shadow gradient 306 is shown for one location along core edge 302. A pixel 308 lies within core perturbation zone 304 at a distance d along shadow gradient 306. Pixel 308 is associated with a point on a core edge texture map (not shown in FIG. 3). The associated point on the core edge texture map determines a luminance value L for pixel 308.

The luminance texture that is mapped onto the pixel can be generated in a variety of ways. In one embodiment, the luminance texture can be modeled on attributes of paint brush strokes, such as the brush strokes of a specific artist, to achieve a painterly effect, or they can be designed arbitrarily based on the esthetic judgment of an art director (or other person involved in creating animated images). The luminance texture can also be generated procedurally.

This luminance value L can be used in conjunction with core edge size and core edge softness parameters to construct a core edge threshold function. In one embodiment, the threshold function uses the well-known "smoothstep" function, smoothstep(min, max, x), which returns the value 1 if $x \geq max$, 0 if $x < min$, and a monotonically increasing value between 0 and 1 for $min \leq x \leq max$. For example, a core threshold function $T_c(d)$, where d is the value of the shadow gradient at the pixel location, can be defined for the core edge as:

$$T_c(d)=\text{smoothstep}(L^*size_c, L^*size_c+softness_c, 1-d), \quad \text{(Eq. 1)}$$

where $size_c$ is the core edge size (defined, e.g., as a fraction of shadow gradient) and $softness_c$ is a core edge softness parameter. The $softness_c$ parameter, which can be selected by a user, controls the smoothness of transitions at the perturbed core edge, as illustrated below. The $softness_c$ parameter can be a fraction of the shadow gradient (e.g., 2%, 10% or the like). If $T_c(d)$ is zero, then the pixel is inside the core region. If $T_c(d)$ is 1, then the pixel is outside the core region (in either the penumbra or unshaded region). If $T_c(d)$ is between 0 and 1, then the pixel is transitioning from the core into the penumbra (or possibly unshadowed) region, and its color will blend colors of both regions.

The threshold function of Eq. 1 can be applied to each pixel within the core perturbation zone. A perturbed core edge is thus defined based on the locus of pixels in the core perturbation zone that are determined to be inside the core. A similar procedure can be used for pixels in the penumbra perturbation zone to perturb the penumbra edge, with a threshold function $T_p(d)$ given, e.g., by:

$$T_p(d)=\text{smoothstep}(L^*size_p, L^*size_p+softness_p, d), \quad \text{(Eq. 2)}$$

where sizes is the penumbra edge size and $softness_p$ is a penumbra-edge softness parameter that can be the same as or different from $softness_c$ as desired.

In these threshold functions $T_c(d)$ and $T_p(d)$, the luminance value L is determined from a texture that can vary arbitrarily among neighboring pixels. As a result, the threshold function for one pixel is not necessarily correlated with that of neighboring pixels. This can give rise to discontinuities in the core edge and/or penumbra edge, allowing island-like features that resemble loose paint to emerge.

FIG. 4 illustrates perturbed (or displaced) core and penumbra edges according to an embodiment of the present invention. The perturbed edges result from applying the threshold functions of Eqs. 1 and 2 to the value of the shadow gradient for the portion of baseline shadow 100 shown in FIG. 2. A "perturbed" core edge 404 and a perturbed penumbra edge 406 have been defined. As shown, the original core edge 108 (or penumbra edge 110) is not simply perturbed in a line-like fashion, as if the boundary were a string or band. Instead, the boundary is determined per-pixel, and the luminance texture used to define the threshold function (e.g., using Eqs. 1 and 2) can vary arbitrarily over the perturbation region. The result is that the boundary is perturbed procedurally, in a non-linear discontinuous fashion. As FIG. 4 shows, this can give rise to "islands" (e.g., areas 422, 424) of the core shadow within the penumbra, "islands" (e.g., areas 426, 428) of the penumbra region within the unshadowed region, "islands" (e.g., areas 430, 432) of the unshadowed region within the penumbra, and "islands" (e.g., areas 434, 436) of the penumbra region within the core shadow. Such islands or discontinuities can resemble stray brush marks that a painter might leave behind, and the degree or frequency of discontinuity can be controlled by selection of textures and/or modifying the decision procedure for each pixel.

Figure 5:
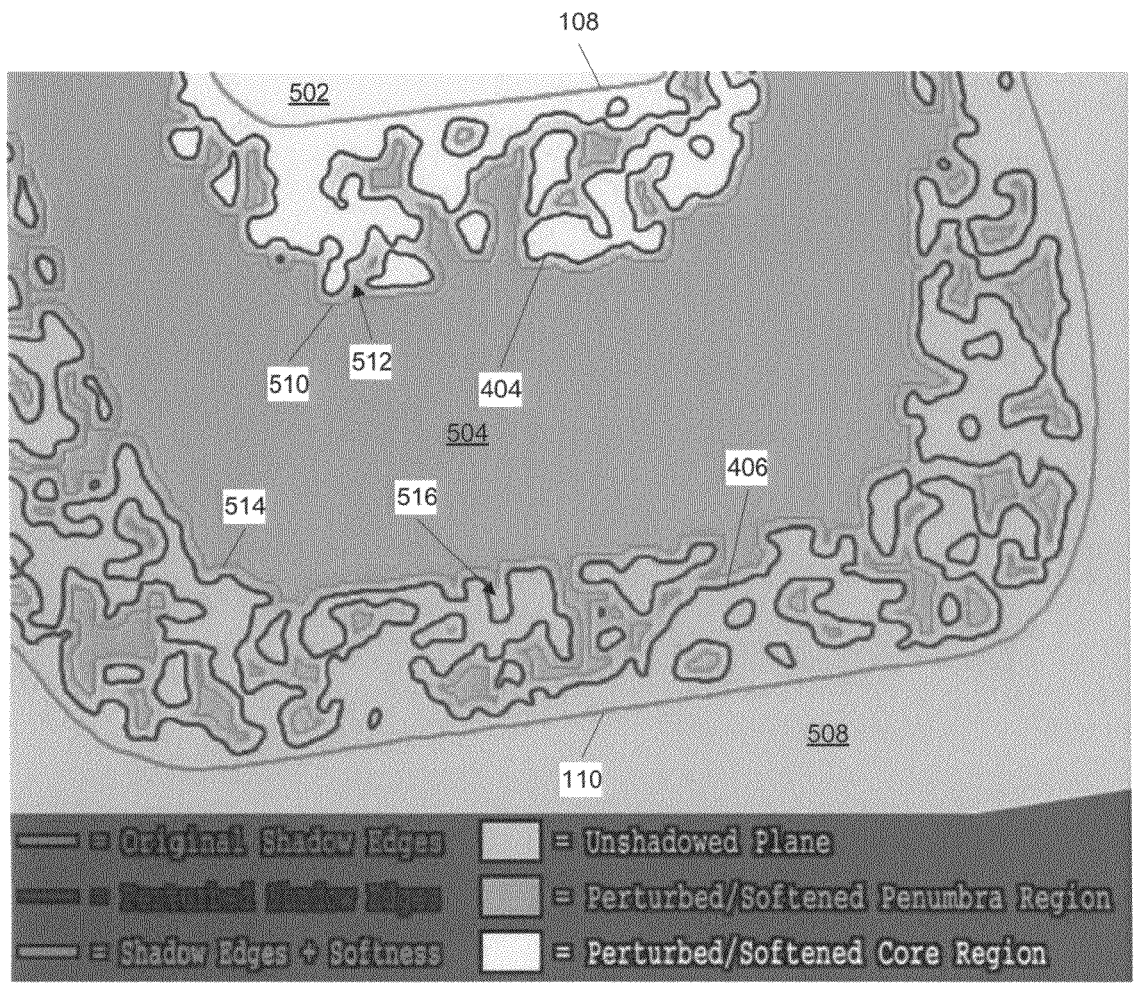
FIG. 5 is a color illustration further showing shadow regions with perturbed edges according to an embodiment of the present invention.

FIG. 5 is a color illustration further illustrating shadow regions with perturbed edges 404 and 406 as shown in FIG. 4. In FIG. 5, original core edge 108 and original penumbra edge 110 are shown as red lines for reference; perturbed core edge 404 and perturbed penumbra edge 406 are shown as blue lines for reference. Areas in a resulting core region 502 are shown in yellow; areas in a resulting penumbra region 504 in pink, and areas in a resulting unshadowed region 508 in gray. Disconnected islands of core shadow within the penumbra and of penumbra within the unshadowed region are apparent.

FIG. 5 further illustrates the softening effect of the smooth-step function used in Eqs. 1 and 2. A smooth transition appears between penumbra and unshadowed regions and/or between core and penumbra regions. The softness$_c$ and softness$_p$ parameters of Eqs. 1 and 2 control these transitions. For reference, FIG. 5 includes an exterior margin 510 (green lines) drawn around perturbed core edge 304. Pixels located between perturbed core edge 404 and exterior margin 510 make a gradual transition from core to penumbra coloration, as represented by the gradual transition from yellow to pink (e.g., in region 512). The distance between perturbed core edge 404 and exterior margin 510 can be controlled by varying the softness$_c$ parameter in Eq. 1.

Similarly, in FIG. 5, an interior margin 514 (green lines) is drawn within perturbed penumbra edge 406. Pixels located between interior margin 514 and perturbed penumbra edge 406 make a gradual transition from penumbra to unshadowed coloration, as represented by the gradual transition from pink to gray (e.g., in region 516). As with the exterior margin described above, the distance between perturbed penumbra edge 406 and interior margin 514 can be controlled by varying the softness$_p$ parameter in Eq. 2.

It will be appreciated that the baseline and perturbed shadows shown and described herein are illustrative and that variations and modifications are possible. The baseline shadow may have any shape, and the perturbation zones may be defined in various ways. Within the perturbation zones, any textures can be applied to displace or perturb the edges, and the textures used for the core perturbation region and penumbra perturbation region can be the same or different. The invention is not restricted to particular textures or formats for specifying textures. In some embodiments, shader expressions or other programming constructs can be used to allow a user to blur the textures (for smoother displaced boundaries), increase their contrast, or to rotate, translate and/or scale the textures, without having to regenerate the texture files themselves. Shader expressions can also be used to generate textures from scratch. One implementation of shader expressions for one well-known rendering program is described in H. Pritchett & T. Lancaster, "RenderMan in production at WDFA," ACM SIGGRAPH 2006 Courses (Session: RenderMan for Everyone, Article No. 5). Painterly shadows in some embodiments are particularly sensitive to contrast in the supplied textures, so it can be convenient to allow the user to adjust texture contrast using a shader expression.

In another embodiment, the luminance value L can be compared with a threshold value T, which can be a user-defined parameter. The threshold T can be constant, or it can be a function of the shadow gradient d such that T(d) increases with decreasing d (corresponding to increasing distance from the core edge). Other threshold functions can also be used. To determine whether pixel 308 is inside or outside the core, the luminance value L associated with that pixel is compared to the threshold T. In one embodiment, if L exceeds T, then pixel 308 is inside the core; otherwise, pixel 308 is outside. It will be understood that test conditions other than L>T can be used to determine whether pixels are inside or outside the core (e.g., $L<T$, $L \geq T$, $L \leq T$). In this embodiment, however, animated shadows may be subject to sizzling effects and other artifacts; post-rendering anti-aliasing techniques may be used to reduce these artifacts.

For shadow rendering as described herein, all that is required is a single texture value per pixel (e.g., luminance on a scale from 0.0 to 1.0, with 0.0 representing black and 1.0 representing white). RGB textures can also be used, and perturbed (or displaced) boundaries can be determined by using the RGB values to calculate a single luminance value, then proceeding as described above. The luminance value advantageously determines how much an edge will be displaced, or how much color or transparency will be introduced, as described below. The painterly shadow effect is particularly sensitive to contrast in the textures; thus, high contrast textures that use the full dynamic range of luminance values may give the most striking results. To increase contrast if desired, a contrast adjustment may be baked directly into a texture map, or an adjustment may be applied to the texture via a shader expression as is known in the art, thereby avoiding the need to regenerate the texture file.

In some embodiments, the textures can advantageously be rotated, translated and scaled, e.g., using special expressions or controls of a graphical user interface. Such operations are particularly helpful where the textures are tilable or periodic. (Periodic textures repeat beyond the boundaries of the texture images.) This avoids visible edges in the textures in the perturbation zones.

Figure 6:
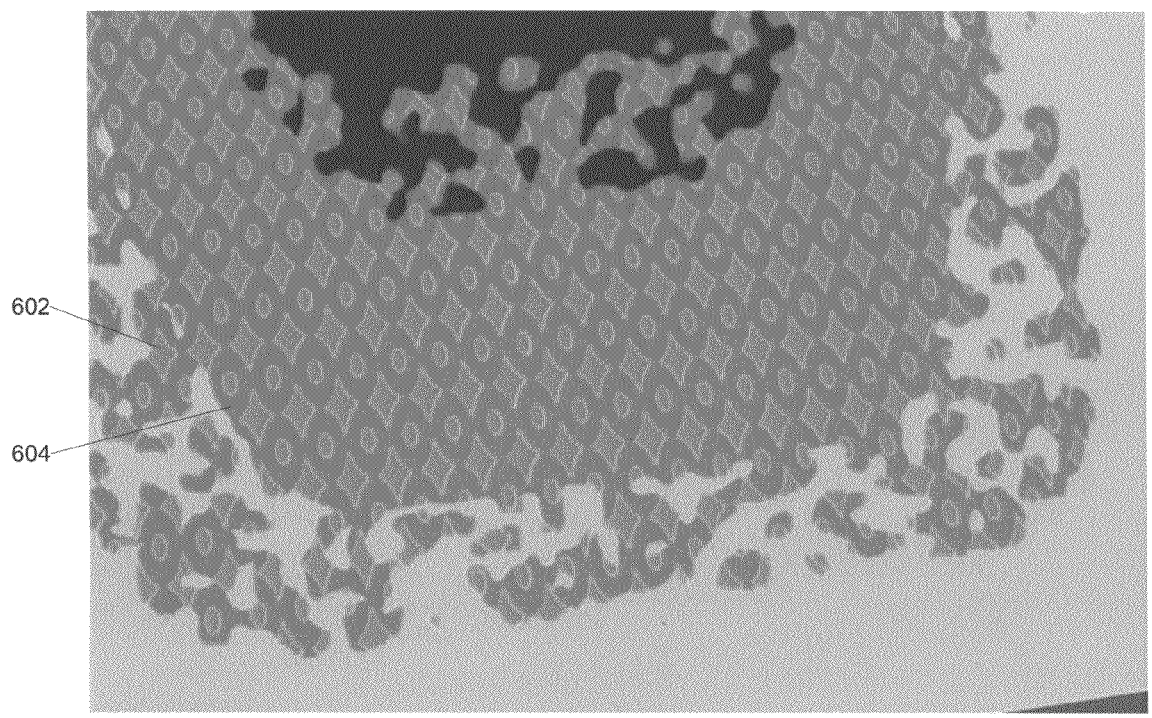
FIG. 6 illustrates a penumbra texture that can be applied in a penumbra region according to an embodiment of the present invention.

In some embodiments, a texture can also be applied within the penumbra region itself, e.g., to mimic the appearance of brush strokes within the penumbra or to improve the transition between the perturbation zones and the unperturbed penumbra. For example, a "base" color and transparency value and a "fill" color and transparency value can be defined, and the penumbra base/fill texture can specify an alpha parameter for blending the base and fill attributes at each point. For example, in one embodiment, either or both of the base and fill colors can be set to the shadow color (automatically determined from the light) or a user-selected custom color. The transparency values can be used to adjust the shadow opacity (or the degree to which the color of the underlying object is visible) in the penumbra region. FIG. 6 illustrates a penumbra base/fill texture that can be applied in a penumbra region according to an embodiment of the present invention. In FIG. 6, green areas 602 correspond to a base attribute and red areas 604 correspond to a fill attribute. Other textures, including textures with no discernible repeating pattern, can also be used for the penumbra base/fill texture. The penumbra base/fill texture can be the same as or different from the core edge texture and/or the penumbra edge texture. If all three are the same, the fill region aligns the textures at the boundaries.

In some embodiments, all of the user-specified textures (core perturbation texture, penumbra perturbation texture, and penumbra base/fill texture) are projected onto the scene from the same coordinate system. The user may be able to specify the coordinate system via a user-input parameter. The texture(s) can be projected from an arbitrary direction, e.g., by creating and positioning an appropriate coordinate system, which can be specified by setting a parameter. In some embodiments, each texture is projected from the light's coordinate system, but it is to be understood that any coordinate system can be used and that different textures can be projected from different coordinate systems.

Figure 7:
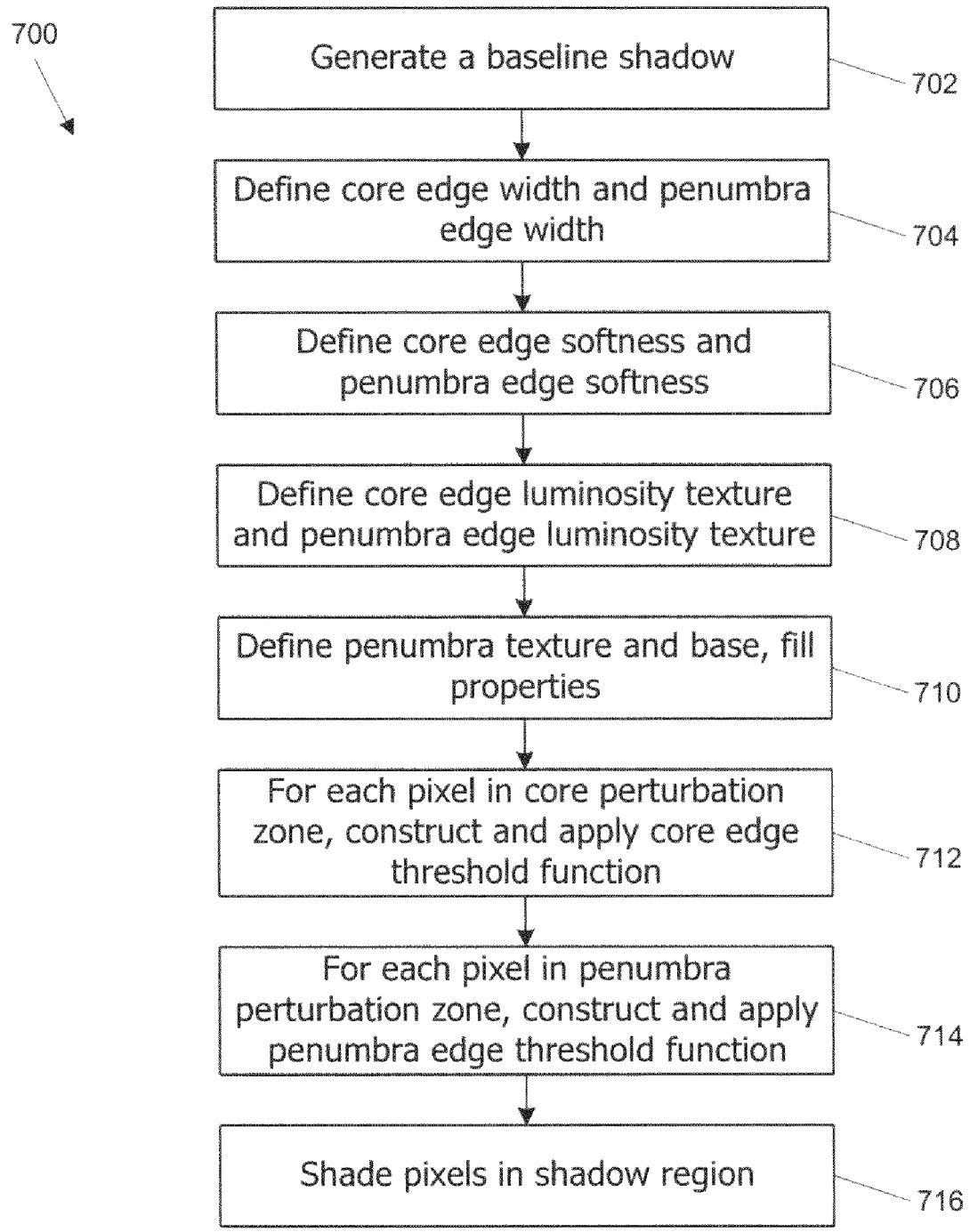
FIG. 7 is a flow diagram of a process for rendering painterly shadows according to an embodiment of the present invention.

FIG. 7 is a flow diagram of a process 700 for rendering painterly shadows according to an embodiment of the present invention. Process 700 can be implemented, e.g., in an interactive rendering tool that accepts user input of rendering parameters, textures, and the like. At step 702, a baseline shadow is generated. Conventional techniques for rendering shadows can be used to generate a baseline shadow. The baseline shadow advantageously is a soft shadow, blurred shadow, or other shadow with core and penumbra regions that allow a shadow gradient to be defined.

At step 704, a core edge width and a penumbra edge width are defined. In some embodiments, the user defines these parameters, and the parameters are advantageously specified as fractions of a shadow gradient. It should be noted that the core edge width and penumbra edge width may be the same or different. These widths, together with the shadow gradient, are used to define the core perturbation zone and the penumbra perturbation zone. In some embodiments, the same core edge width and penumbra edge width parameters are used for all shadows in a given scene; in other embodiments, a user may specify different parameters for different shadows (e.g., shadows cast by different light sources).

At step 706, softness parameters associated with the core edge and the penumbra edge are defined. In some embodiments, the same softness parameter is used for both the core edge and penumbra edge. Similarly, the same softness parameters can be used for all shadows in a given scene, or the user may specify different softness parameters for different shadows (e.g., shadows cast by different light sources).

At step 708, a core edge luminosity texture is associated with the core perturbation zone and a penumbra edge luminosity texture is associated with the penumbra perturbation zone. These textures may be defined by the user as texture maps, or by using procedural texture generation routines or the like. In some embodiments, each texture specifies a value in the range of 0.0 to 1.0 for each pixel; other texture maps can also be used.

At step 710, penumbra properties are defined. In one embodiment, as described above, these properties include base color and transparency, fill color and transparency, and a base/fill texture map that provides a blending parameter for blending the base and fill properties. In some embodiments, penumbra base/fill texturing might be omitted.

At step 712, for each pixel in the core perturbation zone, a core edge threshold function is constructed and applied. Eq. 1 above or other techniques may be used. Similarly, at step 714, for each pixel in the penumbra perturbation zone, a penumbra edge threshold function is constructed and applied. Eq. 2 above or other techniques may be used.

At step 716, pixels in the shadow region can be shaded. Step 716 can include shading pixels in the core, penumbra and perturbation regions. In one embodiment, whether a pixel is within the core or penumbra (or unshadowed) is determined by reference to the perturbed core and penumbra boundaries rather than the unperturbed core edge and penumbra edge. Shading of pixels in shadowed and/or unshadowed regions can include conventional shading techniques. In some embodiments, shading of pixels in the penumbra region includes using the penumbra base/fill texture to blend base and fill attributes (e.g., color and transparency). In some instances, rendering is a multi-pass operation, and shading of pixels based on shadow information may precede or follow other aspects of pixel shading as desired.

Pixel data generated using process 700 is advantageously stored for modification in subsequent rendering passes and/or display for a user. Thereafter, additional rendering operations can be performed as desired.

It will be appreciated that process 700 is illustrative and that variations and modifications are possible. Steps described as sequential may be executed in parallel, order of steps may be varied, and steps may be modified or combined. For example, in some embodiments, such as where penumbra base/fill textures are not applied, perturbation is applied only at the penumbra edge because the perturbation of the core edge will not have a visible effect.

Figure 8A:
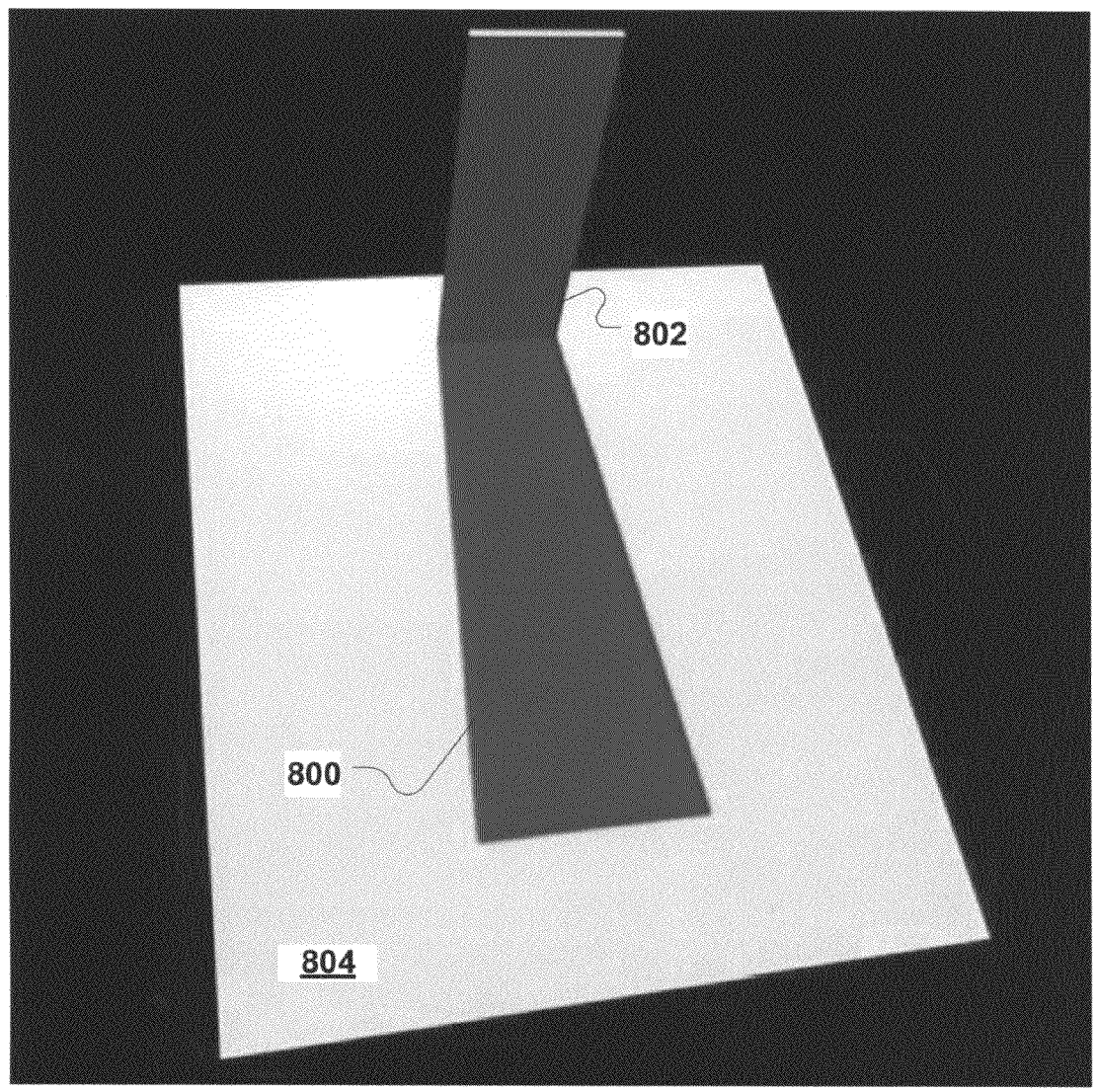
FIGS. 8A-8J illustrate rendering of painterly shadows according to embodiments of the present invention.
Figure 8B:
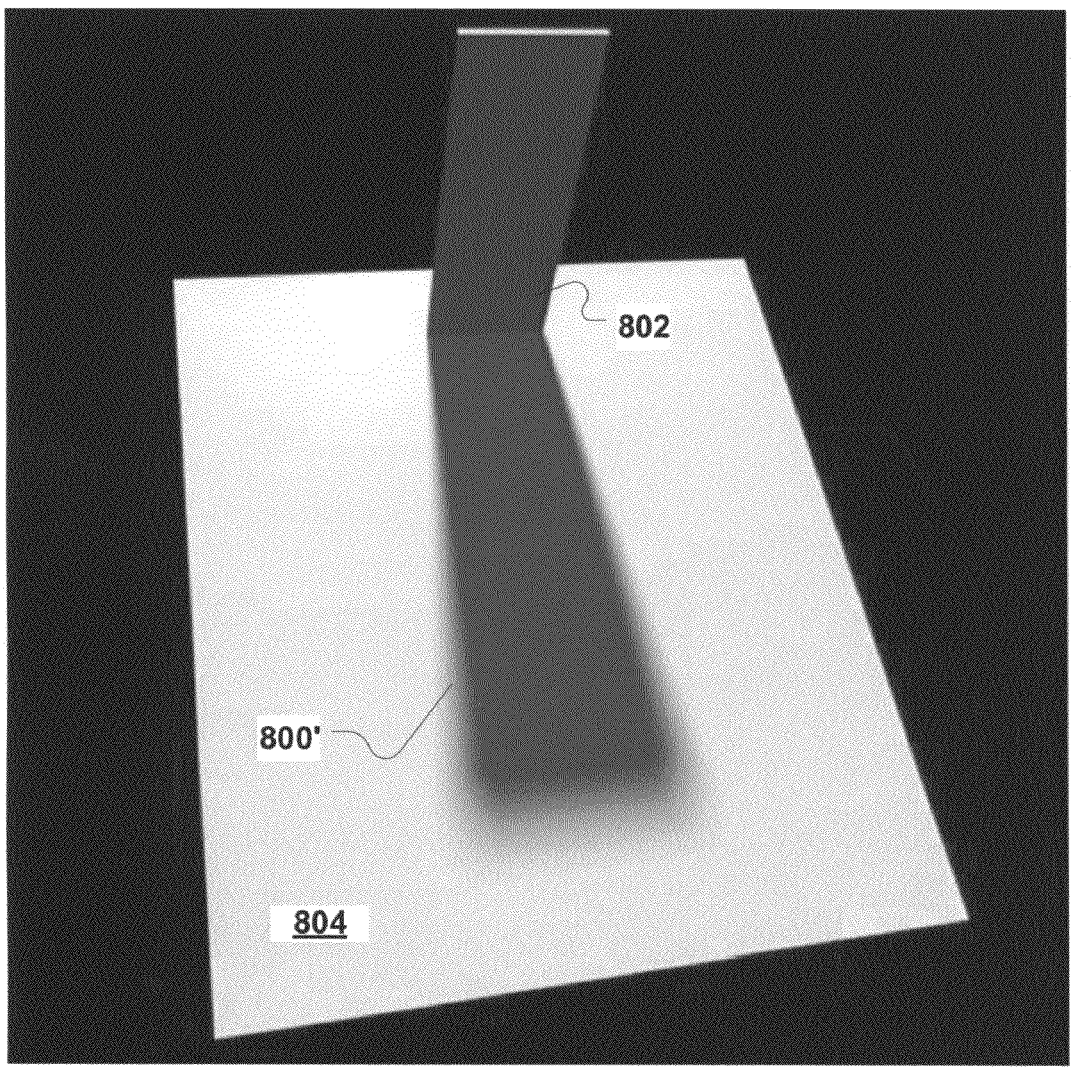

FIGS. 8A-8J further illustrate generation of painterly shadows according to an embodiment of the present invention. FIG. 8A illustrates a rendered surface 804 that is partially covered by a conventional sharp shadow 800 cast by a rendered object 802. FIG. 8B illustrates a blurred shadow 800' that can be generated from sharp shadow 800 of FIG. 8A using conventional techniques. Blurred shadow 800' provides a shadow gradient.

Figure 8C:
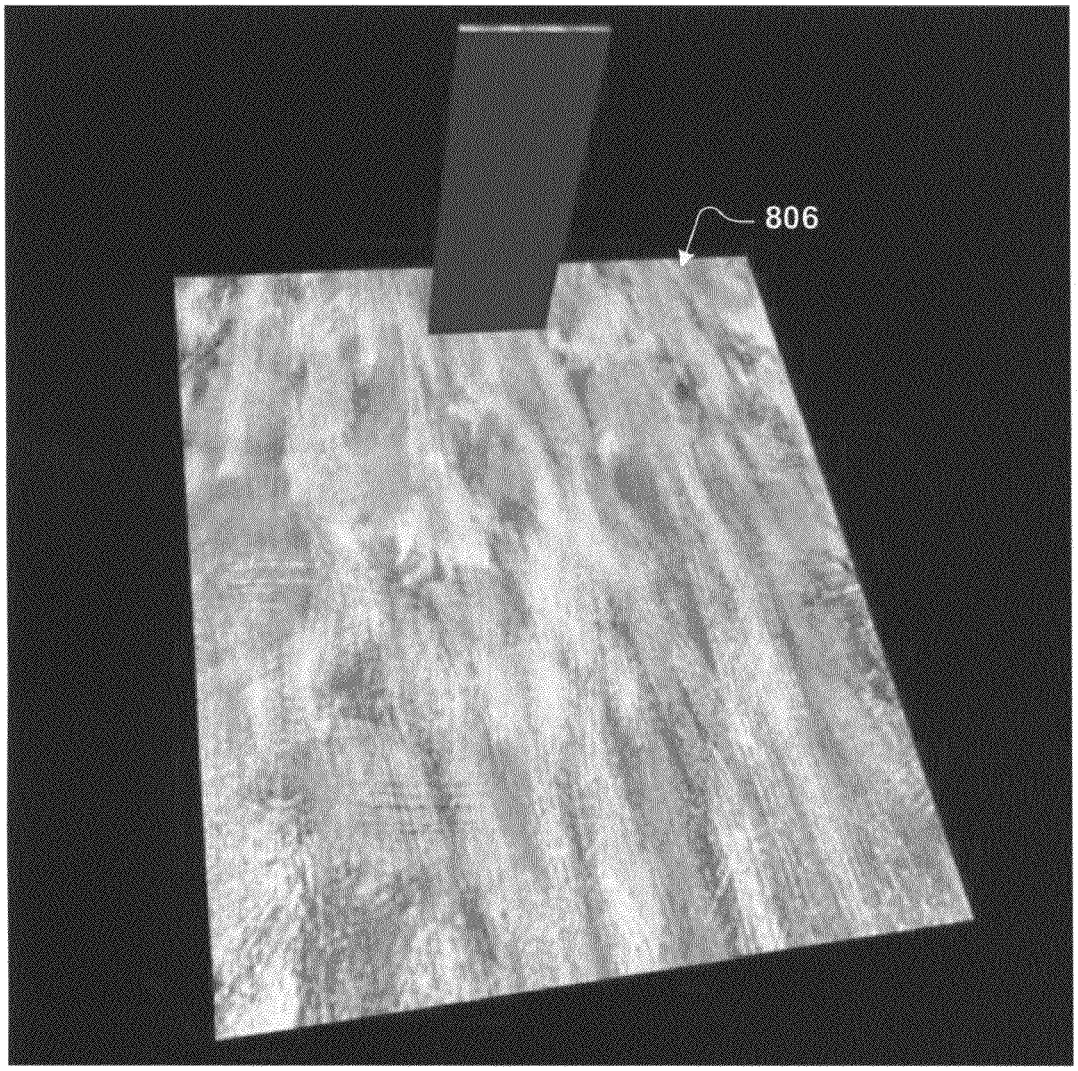
Figure 8D:

FIG. 8C illustrates a brushstroke texture map 806 that can be projected onto surface 804, and FIG. 8D is a close-up view of a portion of brushstroke texture map 806. Brushstroke texture map 806 defines a luminance value L (in the range $0 \leq L \leq 1$) at each location; in FIGS. 8C and 8D, lighter shading corresponds to higher luminance values. As can be seen, the pattern resembles a painter's brush strokes. As noted above, brushstroke texture map 806 can be generated procedurally. In this example, brushstroke texture map 806 will be used as the core edge texture, penumbra edge texture, and penumbra base/fill texture.

Figure 8E:
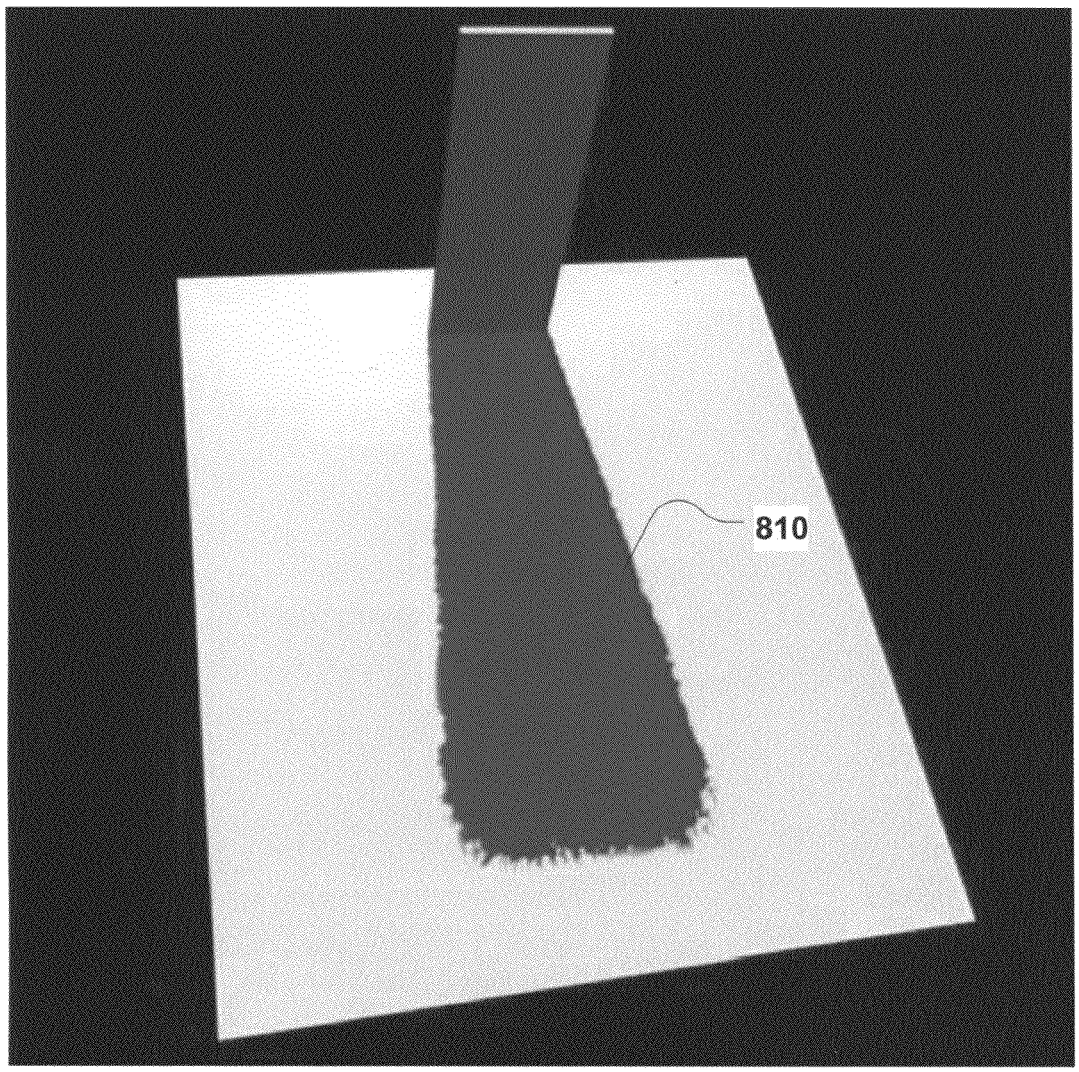
Figure 8F:
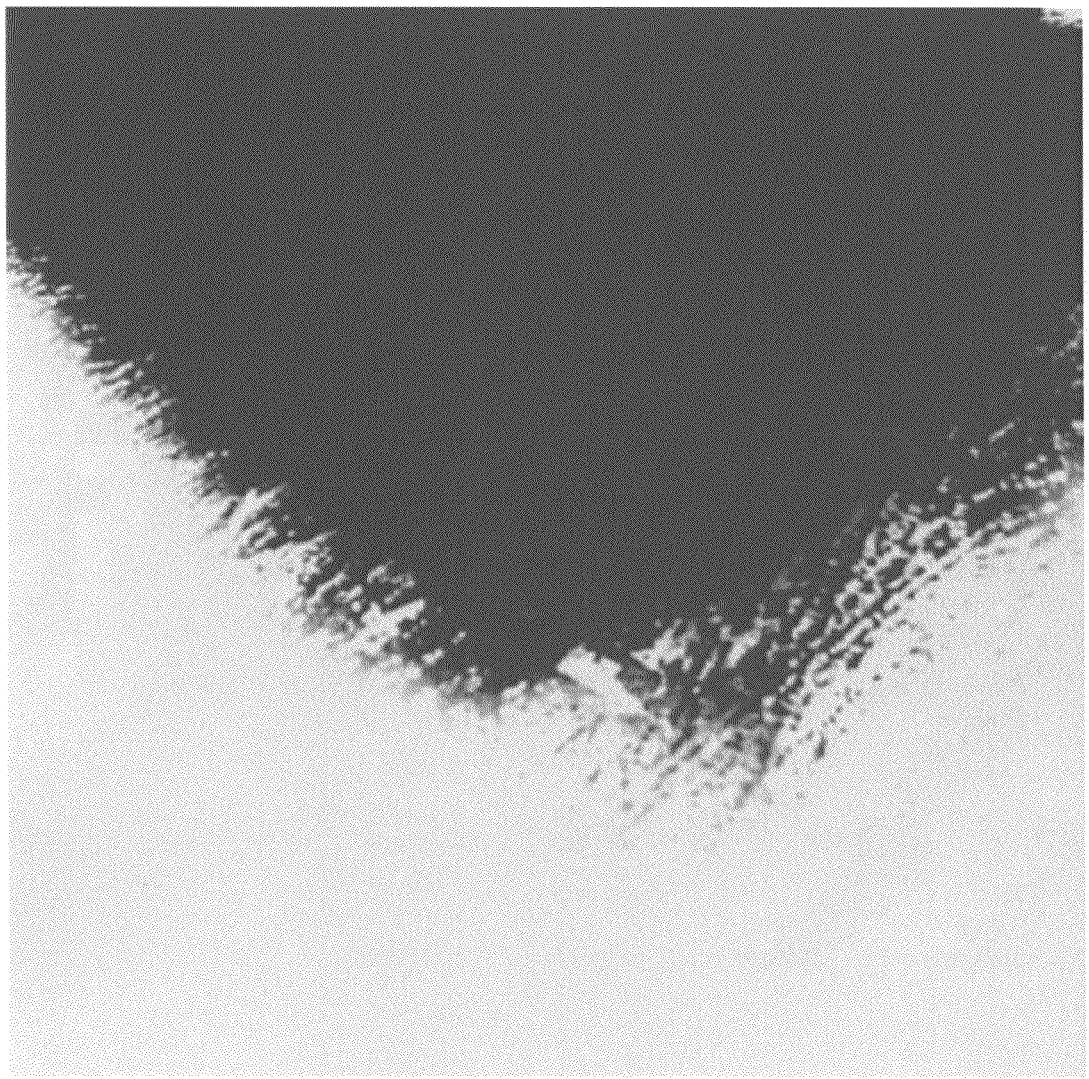

FIG. 8E illustrates a painterly shadow 810 with perturbed core and penumbra edges, and FIG. 8F is a close-up of a portion of painterly shadow 810. Painterly shadow 810 is generated by using blurred shadow 800' of FIG. 8B to determine a shadow gradient value (d) for each pixel and using Eqs. 1 and 2 together with the luminance values L determined from brushstroke texture map 806 of FIG. 8C to define perturbed core and penumbra edges. FIGS. 8E and 8F show the perturbed penumbra edge with island-like features that resemble loose paint. The effect of core perturbation is not visible as no special treatment has been applied to the penumbra region.

Figure 8G:
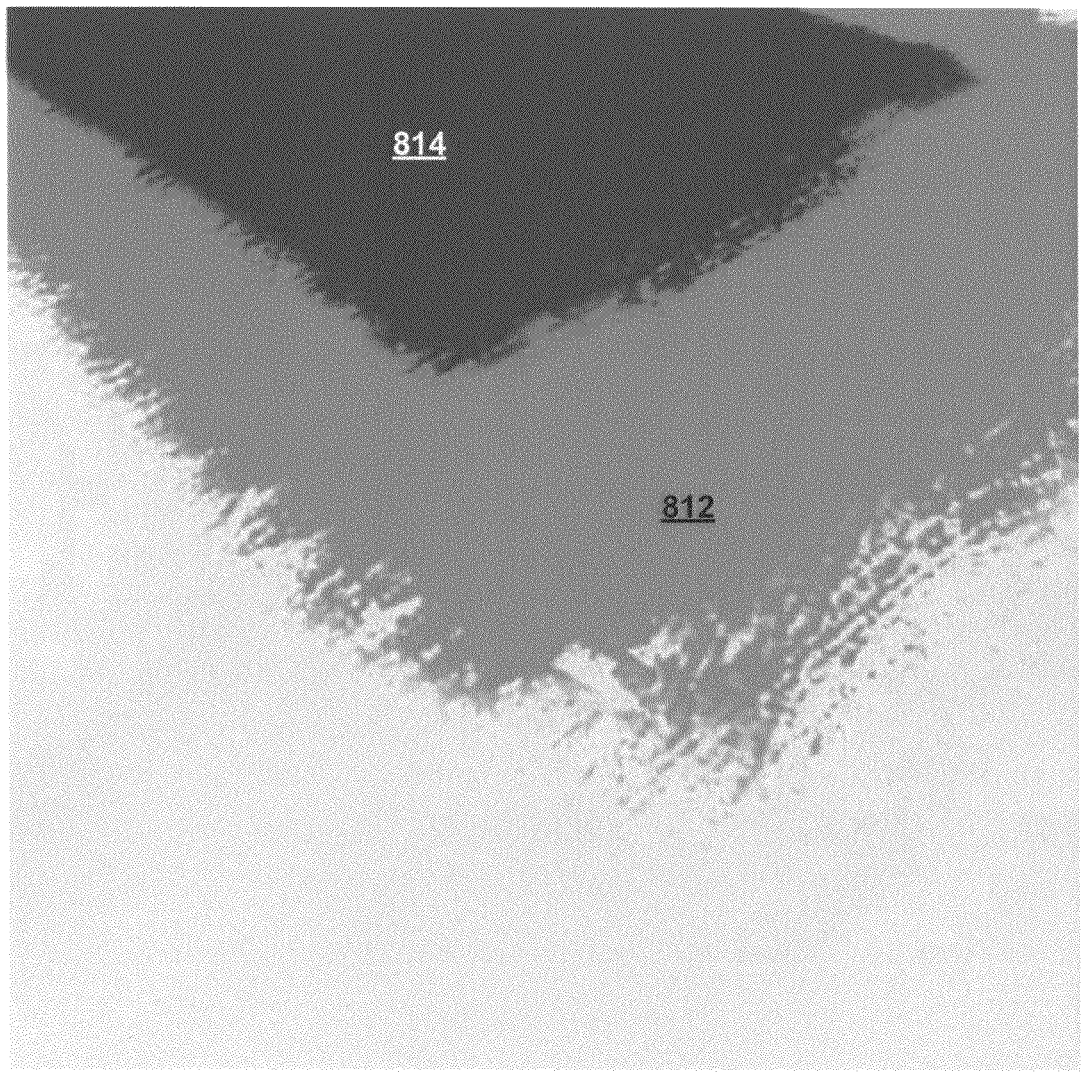

FIG. 8G illustrates the effect of core perturbation. FIG. 8G shows the same painterly shadow as FIG. 8F, except that pixels in penumbra region 812 have been rendered in a distinctive color (red). Loose paint effects at the edge of core region 814 are now visible.

Figure 8H:
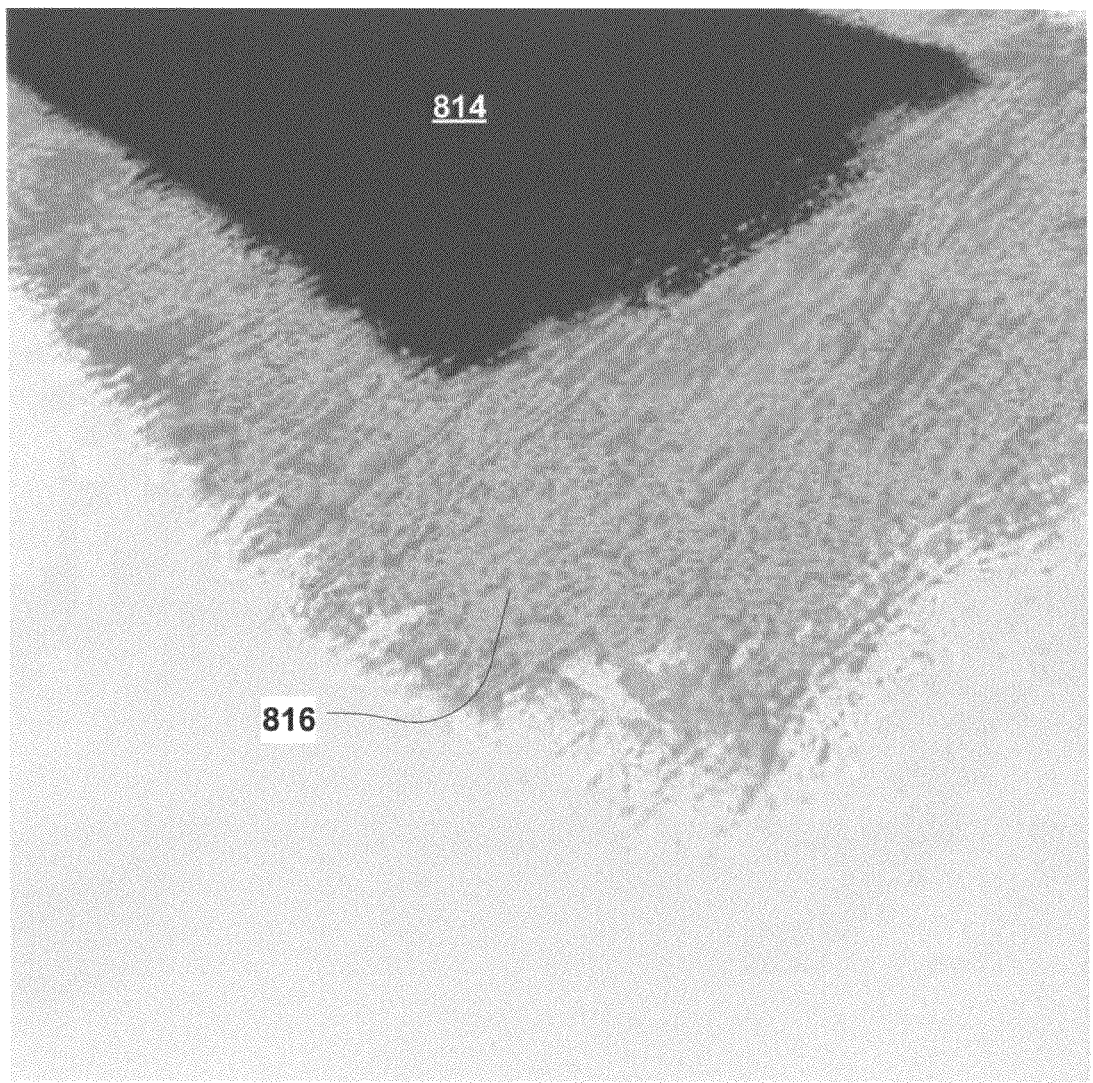

FIG. 8H illustrates the application of brushstroke texture map 806 as a penumbra base/fill texture. A color variation that resembles brush strokes is created within penumbra region 816.

Figure 8I:
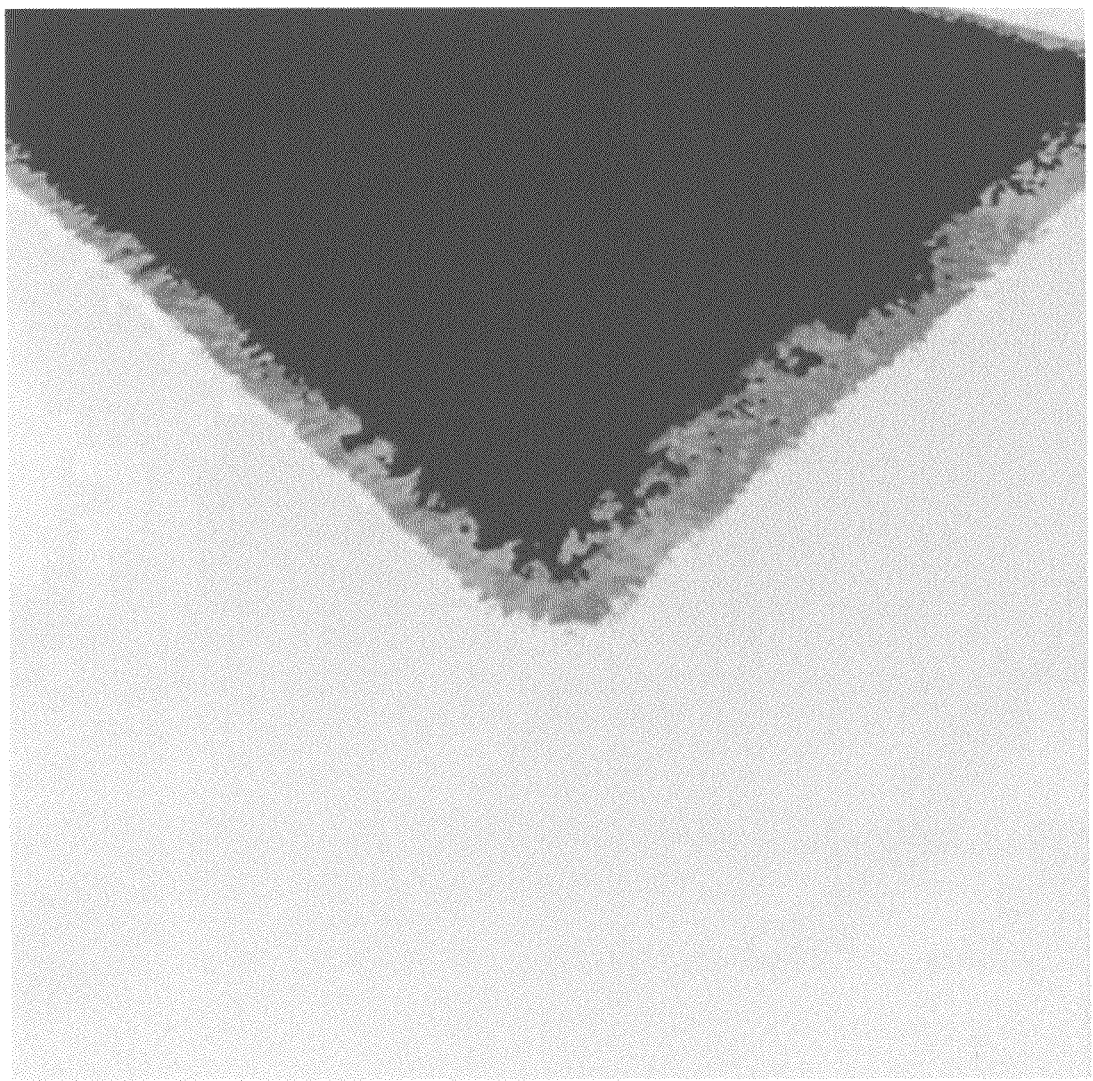
Figure 8J:
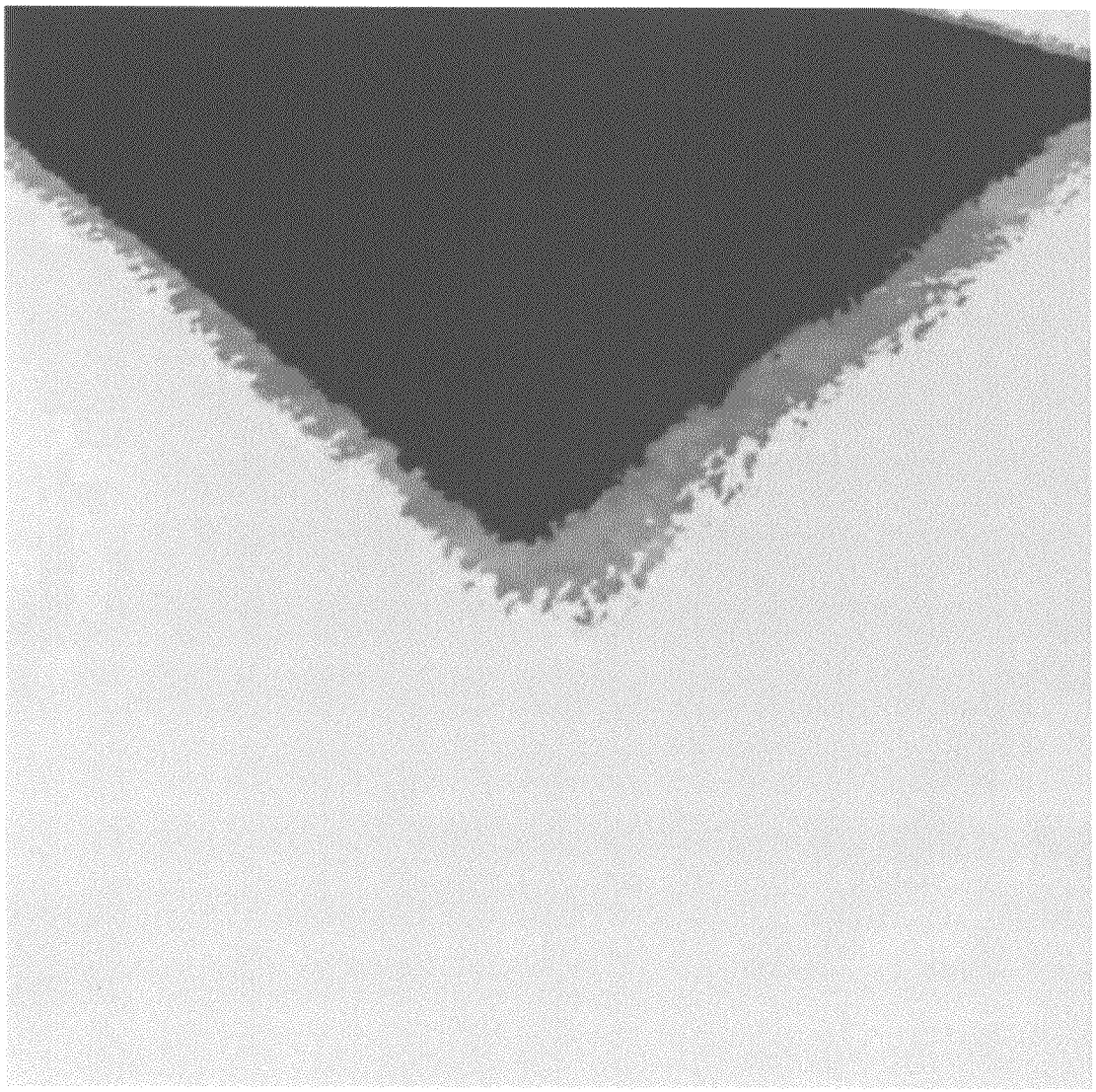

FIGS. 8I and 8J illustrate additional examples of painterly shadows that can be generated for object 802 of FIG. 8A using techniques described herein. In FIG. 8I, the blur (or gradient width) in the baseline shadow has been reduced as compared to FIG. 8H. In addition, the penumbra base and fill colors are different, and the core and penumbra edge sizes and smoothness parameters have been modified. In FIG. 8J, these parameters have been further adjusted, and blurring has been applied to the textures to provide a softer appearance. Thus, the techniques used herein can be used to produce a wide range of esthetic effects.

Figure 9A:
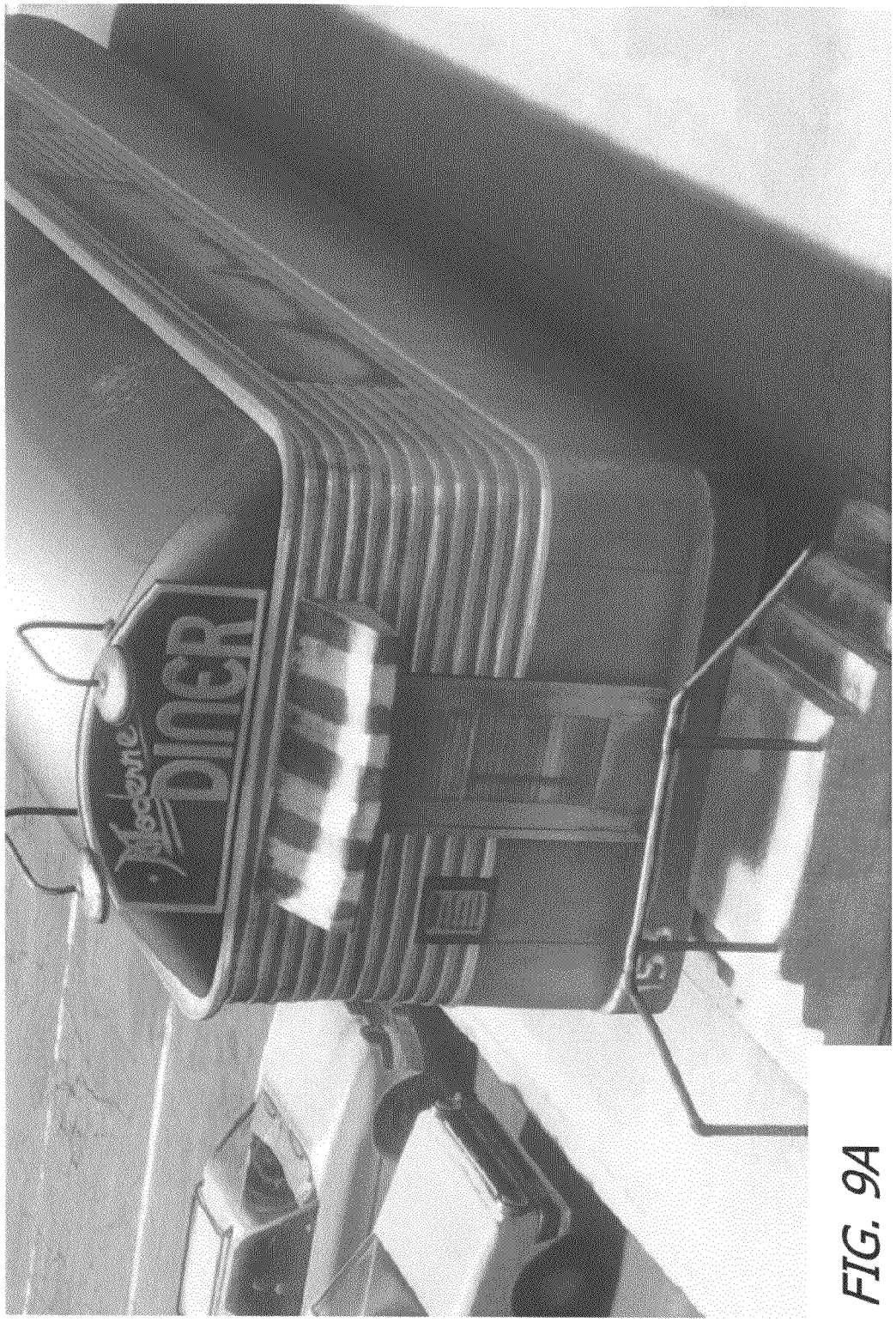
FIG. 9A is rendered as a daylight scene.
Figure 9B:
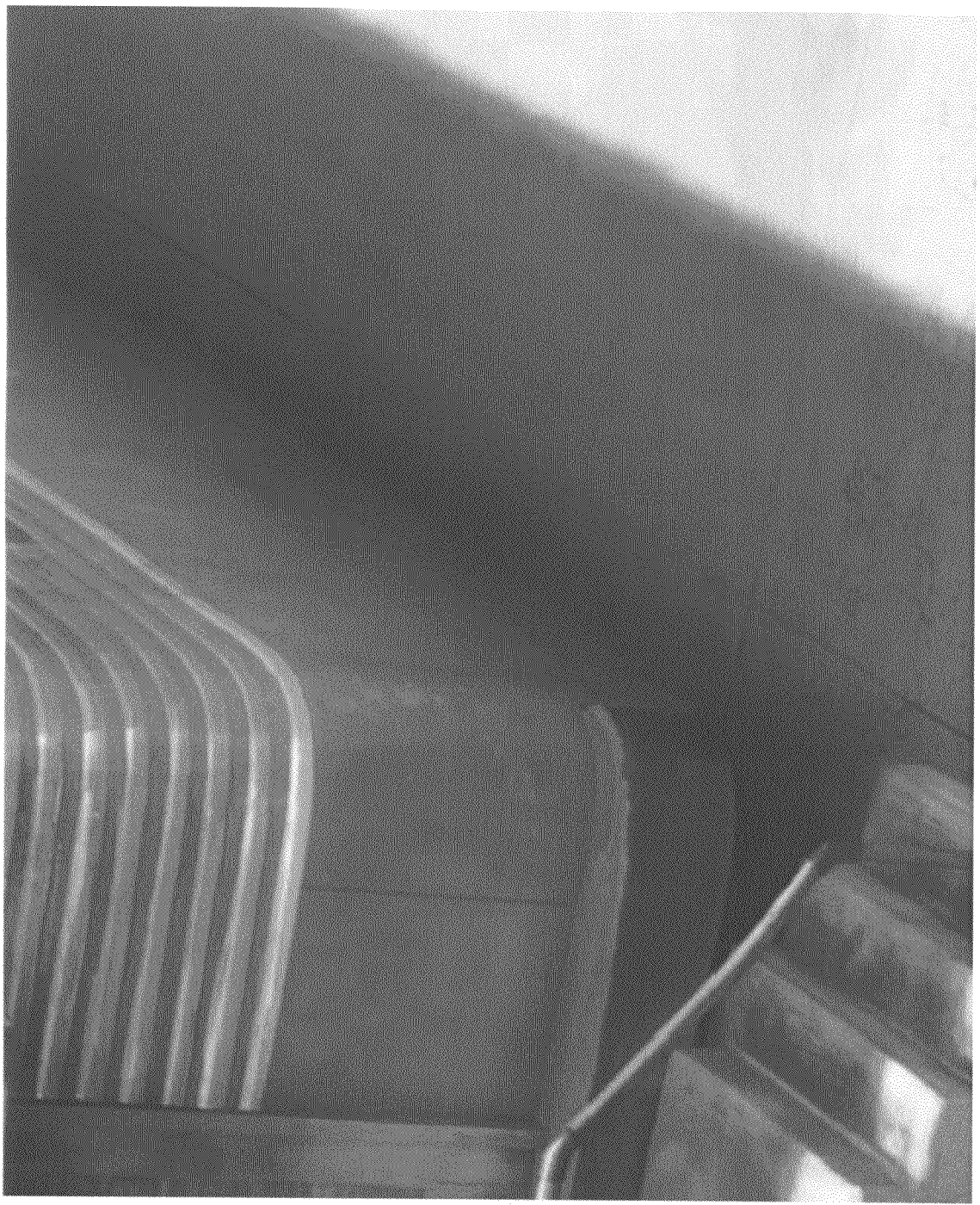
FIG. 9B is a detail from the scene of FIG. 9A.

FIGS. 9 and 10 are rendered images of scenes with painterly shadows rendered according to an embodiment of the present invention, as well as other painterly qualities. FIG. 9A shows a scene rendered using a daylight lighting model with a single light source (modeling the sun, which casts relatively sharp shadows). Shadows cast by the diner and cars are rendered with painterly effects, and some erosion (uneven edge) of the shadow region due to boundary perturbation can be seen. The painterly effect is most pronounced in the shadow of the diner, a portion of which is shown in more detail in FIG. 9B. The painterly effect is less pronounced for the shadows of the cars because the baseline shadows for the cars were generated with lower blur settings than the baseline shadow of the diner. These two shadow maps were combined in the single light to produce a broader painterly shadow edge for the diner and a narrower painterly shadow edge for the cars.

Figure 10A:
FIG. 10A shows the same scene as FIG. 9A, rendered as a night scene.
Figure 10B:
FIG. 10B is a detail from the scene of FIG. 10A.

FIG. 10A shows a similar scene to FIG. 9A, but rendered as a night scene. The shadow to the right of the diner has a more pronounced penumbra, as shown in more detail in FIG. 10B, and the painterly effect can be more clearly seen in both the core-to-penumbra and penumbra-to-unshadowed transitions.

While the invention has been described with reference to specific embodiments, one skilled in the art will recognize that numerous modifications are possible. The present invention is not limited to particular textures or number of textures or number of regions, transitions, etc. between fully shadowed areas and unshadowed areas. Those skilled in the art will recognize that a core region of a shadow can also be given a painterly appearance, e.g., by applying a suitable texture to the core (similar to penumbra textures described herein).

The perturbation zones shown herein (e.g., in FIG. 4) are illustrative and can be defined differently. For example, in FIG. 4, the core perturbation zone extends outward from the core edge while the penumbra perturbation zone extends inward from the penumbra edge. In other embodiments, all or part of the core perturbation zone can extend inward from the core edge, and all or part of the penumbra perturbation zone can extend outward from the penumbra edge. Different esthetic effects can be achieved by extending the perturbation zones inward (which will tend to reduce the area covered by shadow) or outward (which will tend to increase the area covered by shadow).

The width of the perturbation zones can also be varied. In some of the embodiments shown herein, the core perturbation zone and penumbra perturbation zone extend toward each other but do not meet or overlap, and the shadow has an unperturbed penumbra region (see, e.g., FIG. 5). In other embodiments, the core and penumbra edges do overlap, and priority rules can be established to resolve seemingly contradictory cases such as a point that is inside the perturbed core boundary but outside the perturbed penumbra boundary. (For example, a priority rule can state that all pixels inside the perturbed core boundary are treated as being inside the core, regardless of where the pixel is in relation to the perturbed penumbra boundary.) The images in FIGS. 9 and 10 were generated using large values for the edge size parameters in combination with large softness values in Eqs. 1 and 2. The result in these examples is a fairly realistic painterly style. More abstract or pointillistic painterly styles can also be achieved by adjusting the baseline shadows, shadow perturbation parameters, and/or shadow texture(s).

Some components of the processes described herein can be implemented using suitably-configured computer systems. Such systems may be of conventional design and may include standard components such as microprocessors, monitors, keyboards, mice, magnetic disk drives, CD or DVD drives, flash drives, network interface components, and the like. In addition, interconnected groups of computers (e.g., server farms) may be used to practice aspects of the present invention. While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as CD or DVD, flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download to a storage medium connected to the recipient's computer system).

Thus, although the invention has been described with respect to specific embodiments, it will be appreciated that the invention is intended to cover all modifications and equivalents within the scope of the following claims.

What is claimed is:

1. A method for rendering shadows, the method comprising:
   generating a baseline shadow having a core and a penumbra;
   defining, within the baseline shadow, a penumbra perturbation zone;
   associating a penumbra edge texture map with the penumbra perturbation zone;
   determining, based on the penumbra edge texture map, whether each point of a plurality of points within the penumbra perturbation zone is within a displaced penumbra boundary; and
   rendering an image using the displaced penumbra boundary, wherein points within the displaced penumbra boundary are rendered as part of the penumbra and points outside the displaced penumbra boundary are rendered as part of an unshadowed region.

2. The method of claim 1 further comprising:
   defining an unperturbed penumbra edge corresponding to an outer boundary of the penumbra of the baseline shadow; and
   defining, as the penumbra perturbation zone, an area extending inward from the unperturbed penumbra edge into the penumbra.

3. The method of claim 2 further comprising:
   defining an unperturbed core edge corresponding to an outer boundary of the core of the baseline shadow;
   for each of a plurality of points on the unperturbed core edge, defining a respective shadow gradient extending from the point on the unperturbed core edge to a respective point on the unperturbed penumbra edge; and defining the penumbra perturbation zone as a fraction of a length of the shadow gradient.

4. The method of claim 2 wherein:

defining the baseline shadow includes defining a shadow gradient value for points within the penumbra; and defining the penumbra perturbation zone includes defining a range of shadow gradient values such that points having a shadow gradient value within the range are within the penumbra perturbation zone.

5. The method of claim 1 wherein the penumbra edge texture map is defined to emulate paintbrush strokes.

6. The method of claim 1 wherein defining the baseline shadow includes defining a shadow gradient value for points within the penumbra and wherein the act of determining includes:

defining a smoothstep function based in part on a size of the penumbra perturbation zone and in part on the penumbra edge texture map; and applying the smoothstep function to the shadow gradient value for each of a plurality of points within the penumbra perturbation zone.

7. The method of claim 1 further comprising:

storing the image on a storage medium.

8. The method of claim 7 wherein the storage medium comprises film.

9. The method of claim 7 wherein the storage medium comprises a computer readable storage medium that stores a digital representation of the image.

10. The method of claim 7 further comprising:

displaying the image.

11. A method for rendering shadows, the method comprising:

generating a baseline shadow having a core and a penumbra;

defining, within the baseline shadow, a core perturbation zone and a penumbra perturbation zone;

associating a core edge texture map with the core perturbation zone and a penumbra edge texture map with the penumbra perturbation zone;

determining, based on the core edge texture map, whether each point of a plurality of points within the core perturbation zone is within a displaced core boundary;

determining, based on the penumbra edge texture map, whether each point of a plurality of points within the penumbra perturbation zone is within a displaced penumbra boundary; and rendering an image using the displaced core boundary and the displaced penumbra boundary, wherein points within the displaced core boundary are rendered as part of the core and points within the displaced penumbra boundary but not within the displaced core boundary are rendered as part of the penumbra.

12. The method of claim 11 further comprising:

defining an unperturbed core edge corresponding to an outer boundary of the core of the baseline shadow; and defining, as the core perturbation zone, an area extending outward from the unperturbed core edge into the penumbra.

13. The method of claim 12 further comprising:

defining an unperturbed penumbra edge corresponding to an outer boundary of the penumbra of the baseline shadow;

for each of a plurality of points on the unperturbed core edge, defining a respective shadow gradient extending from the point on the unperturbed core edge to a respective point on the unperturbed penumbra edge; and defining the core perturbation zone as a first fraction of a length of the shadow gradient.

14. The method of claim 13 further comprising:

defining, as the penumbra perturbation zone, an area extending inward from the unperturbed penumbra edge into the penumbra, wherein the penumbra perturbation zone is defined as a second fraction of the length of the shadow gradient.

15. The method of claim 14 wherein a sum of the first fraction plus the second fraction is less than one.

16. The method of claim 11 further comprising:

defining an unperturbed penumbra edge corresponding to an outer boundary of the penumbra of the baseline shadow; and defining, as the penumbra perturbation zone, an area extending inward from the unperturbed penumbra edge into the penumbra.

17. The method of claim 16 further comprising:

defining an unperturbed core edge corresponding to an outer boundary of the core of the baseline shadow;

for each of a plurality of points on the unperturbed core edge, defining a respective shadow gradient extending from the point on the unperturbed core edge to a respective point on the unperturbed penumbra edge; and defining the penumbra perturbation zone as a fraction of a length of the shadow gradient.

18. The method of claim 11 wherein the core edge texture map and the penumbra edge texture map are defined to emulate paintbrush strokes.

19. The method of claim 11 wherein the core edge texture map and the penumbra edge texture map are the same texture map.

20. The method of claim 11 wherein the core edge texture map and the penumbra edge texture map are different texture maps.

21. The method of claim 11 further comprising:

applying a first smoothing function to points near the displaced core boundary; and applying a second smoothing function to points near the displaced penumbra boundary.

22. The method of claim 11 further comprising:

associating a penumbra texture with the penumbra; and using the penumbra texture to blend two candidate attributes for a pixel in the penumbra.

23. The method of claim 11 further comprising:

storing the image on a storage medium.

24. The method of claim 23 wherein the storage medium comprises film.

25. The method of claim 23 wherein the storage medium comprises a computer readable storage medium that stores a digital representation of the image.

26. The method of claim 23 further comprising:

displaying the image.

27. A motion picture product comprising a sequence of images stored on a non-transitory storage medium, the sequence of images including images of objects having shadows, each of the shadows being created by a process comprising:

generating a baseline shadow having a core and a penumbra;

defining, within the baseline shadow, a core perturbation zone and a penumbra perturbation zone;

associating a core edge texture map with the core perturbation zone and a penumbra edge texture map with the penumbra perturbation zone;

determining, based on the core edge texture map, whether each point of a plurality of points within the core perturbation zone is within a displaced core boundary;

determining, based on the penumbra edge texture map, whether each point of a plurality of points within the penumbra perturbation zone is within a displaced penumbra boundary; and rendering an image using the displaced core boundary and the displaced penumbra boundary, wherein points within the displaced core boundary are rendered as part of the core and points within the displaced penumbra boundary but not within the displaced core boundary are rendered as part of the penumbra, wherein the shadows have a hand-painted appearance.

* * * * *